United States Patent [19]

Kelley

[11] 3,763,012

[45] Oct. 2, 1973

[54] APPARATUS FOR REMOVING POLLUTANTS FROM GASEOUS EFFLUENT

[75] Inventor: Charles F. Kelley, Gassville, Ark.

[73] Assignee: W. J. Budwine, Carlsbad, N. Mex.

[22] Filed: Apr. 5, 1972

[21] Appl. No.: 241,192

[52] U.S. Cl. ................... 202/93, 202/212, 55/223
[51] Int. Cl. ............................................. C10b 9/00
[58] Field of Search ................... 55/223, 260, 463, 55/464, 93, 94, 228; 202/93, 211, 212, 214, 101, 213, 86, 87, 88, 92

[56] References Cited
UNITED STATES PATENTS

| 3,532,595 | 10/1970 | Arnesjo et al. | 55/223 X |
|---|---|---|---|
| 3,668,839 | 6/1972 | Misarek et al. | 55/223 |
| 1,062,446 | 5/1913 | Ernst | 55/223 |
| 3,260,036 | 7/1966 | De Bellis | 55/223 |
| 363,313 | 5/1887 | Burrell | 202/93 X |
| 865,067 | 9/1907 | Train | 202/93 |
| 2,956,933 | 10/1960 | Jolin | 202/93 X |
| 1,894,744 | 1/1933 | Hawley | 55/223 |
| 2,484,277 | 10/1949 | Fisher | 55/223 |
| 3,353,336 | 11/1967 | Caballero | 55/228 |
| 3,353,335 | 11/1967 | Caballero | 55/223 X |
| 3,626,667 | 12/1971 | Marc | 55/94 |

Primary Examiner—Norman Yudkoff
Assistant Examiner—David Edwards
Attorney—Harvey B. Jacobson et al.

[57] ABSTRACT

An apparatus for removing pollutants of all types from a gaseous effluent that is moving in a flow path from the source of the gaseous effluent until the cleaned gaseous effluent is discharged to ambient atmosphere. The apparatus includes a separator in the form of a housing having baffle means therein and spray nozzles oriented in a particular relationship for forming a particular flow path through the separator during which the gaseous effluent is treated by contact with a liquid cleaning solution, such as water, discharged from the spray nozzles. The apparatus also includes a burner assembly communicating with the discharge of the separator for final combustion of any residual burnable material contained in the gaseous effluent prior to discharge into the ambient atmosphere. The apparatus is associated with a charcoal forming kiln having a unique structure and association with the pollutant removing apparatus for more efficiently forming charcoal and effectively removing pollutants from the gaseous effluent from the kiln. In this application, the charcoal kiln has been disclosed to illustrate an effective utility for the pollutant removing apparatus and it is within the purview of this invention to utilize the pollutant removing apparatus with other devices which have a gaseous effluent with pollutants therein.

9 Claims, 9 Drawing Figures

APPARATUS FOR REMOVING POLLUTANTS FROM GASEOUS EFFLUENT

BACKGROUND OF THE INVENTION

1. Field of the Invention

The present invention generally relates to an apparatus for removing pollutants from gaseous effluent by subjecting the gaseous effluent to a tortuous or zigzag flow path within a housing while impinging the effluent against a water surface and subjecting the effluent to a plurality of spray nozzles from which a liquid cleaning solution, such as water, is dicharged for effectively removing pollutants from the effluent and subsequently subjecting the "washed" gaseous effluent to a burner assembly for completely burning any residual burnable material in the effluent. This invention also relates to one particular source of polluted gaseous effluent in the form of a charcoal kiln which emits a gaseous effluent with various types of pollutants therein.

2. Description of the Prior Art

The problem of atmospheric pollution by discharge of gaseous effluents with pollutants entrained therein into the atmosphere has been long existent. Also, water pollution by discharge of effluents containing pollutants has been and remains a serious problem. Presently, many regulations and laws exist or are contemplated relating to the discharge of pollutants from various notorious sources such as incinerators, heating systems, industrial wastes and many other sources of emissions having pollutants incorporated therein.

Due to the seriousness of the problem, many efforts have been made to remove pollutants from emissions or effluents. Where gaseous effluents or emissions are involved, burner assemblies, generally referred to as after-burners, have been incorporated into the gaseous effluent flow path for igniting and burning combustible pollutants in the effluent. Additionally, efforst have been made to "wash" the gaseous effluent by associating a liquid cleaning solution with the gaseous effluent by various techniques and procedures including the use of water sprays directed into the gaseous effluent during its movement along a flow path prior to discharge to the atmosphere.

While such previously known devices have been practiced and have been successful to a certain degree, such known devices have not been fully successful to remove the pollutants to the degree desired in an efficient manner at a cost which is economically feasible.

SUMMARY OF THE INVENTION

An object of the invention is to provide an apparatus for removing pollutants from gaseous effluent incorporating a separator in the form of a housing having an intake and outlet for the gaseous effluent arranged at opposite sides of the housing together with baffle means within the housing to cause the gaseous effluent to flow in a tortuous or zigzag path together with a unique arrangement of spray nozzles for discharging water spray into the gaseous effluent for removing pollutants therefrom.

Another object of the invention is to provide an apparatus in accordance with the preceding object together with a burner assembly receiving the gaseous effluent from the separator and burning any remaining combustible constituents of the gaseous effluent before discharge into the atmosphere, water or to any other effluent receiving material or area.

A further object of the invention is to provide an apparatus for efficiently removing pollutants from a gaseous effluent at a cost that is economically feasible with the apparatus being specifically adapted for, but not limited to, use in combination with a charcoal kiln which produces an effluent that is highly polluted and relatively difficult to clean.

Yet another object of the invention is to provide a unique and novel charcoal kiln that is portable in nature and includes structural arrangements that more efficiently produces charcoal by reducing the "burn" time required and producing a larger quantity of higher quality charcoal from a given quantity of wood.

Still another important object of the invention is to provide an apparatus for removing pollutants from gaseous effluent that is capable of variation in size for adapting it to various uses with the proportions and arrangements of the components of the apparatus remaining the same thus maintaining the effectiveness and efficiency of the apparatus regardless of its use thereby enabling the apparatus to be economically used in various installations.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 8 is a detail sectional view of the structure which communicates the lower portion of the kiln with a collecting duct for the gaseous effluent or emission from the kiln.

FIG. 9 is a detail sectional view illustrating the structure of air inlets at the bottom of the kiln.

DESCRIPTION OF THE PREFERRED EMBODIMENTS

Figure 1:
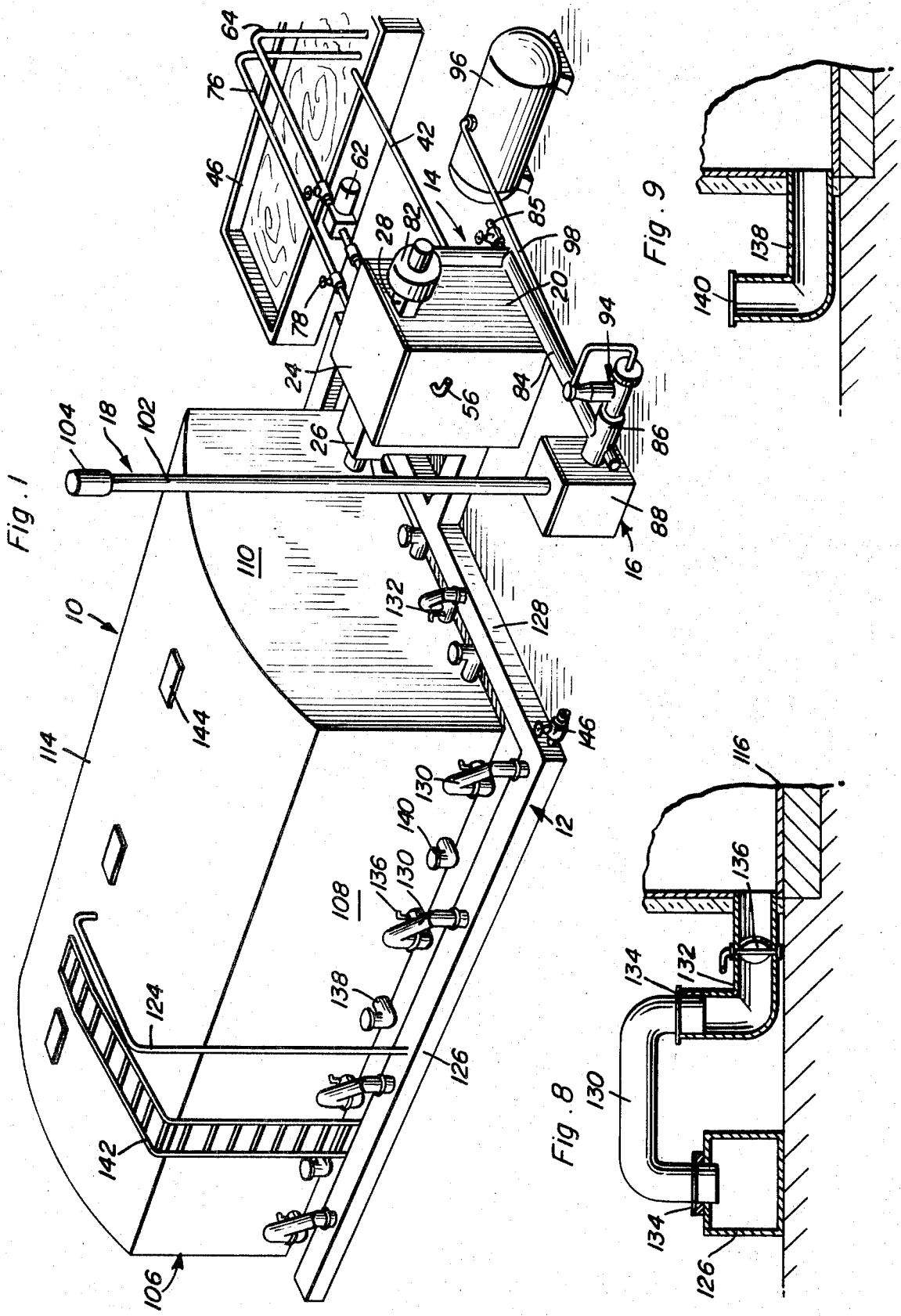
FIG. 1 is a perspective view of the apparatus for removing pollutants from the gaseous effluent and a charcoal kiln associated therewith.
Figure 2:
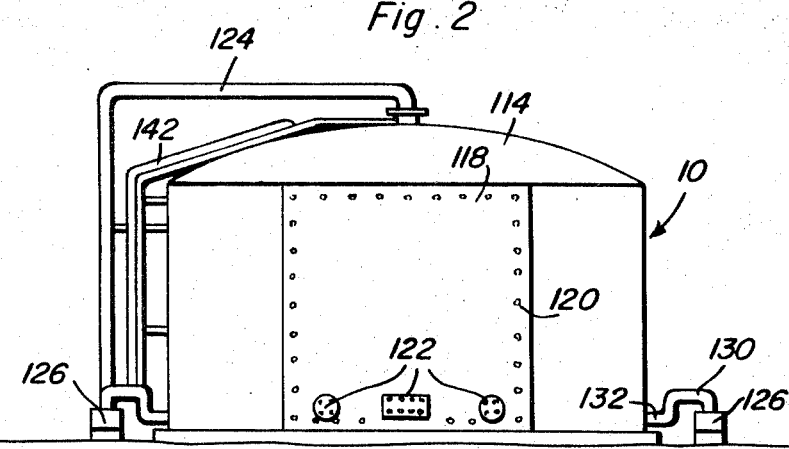
FIG. 2 is an end view of the charcoal kiln.
Figure 6:
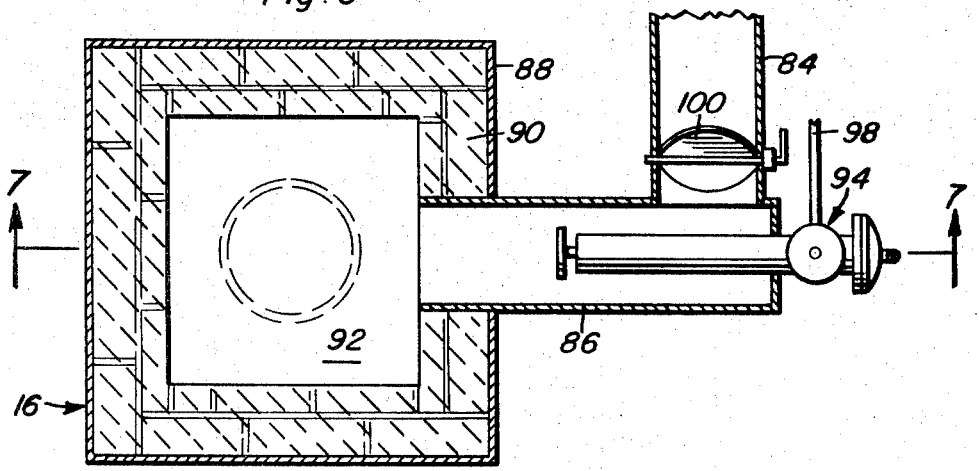
FIG. 6 is a top plane sectional view of the burner assembly which receives the gaseous effluent from the separator.
Figure 7:
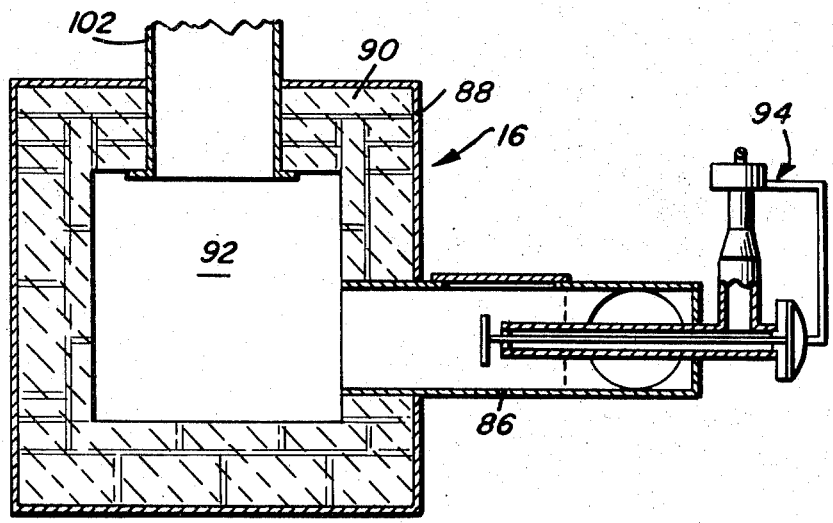
FIG. 7 is a vertical sectional view taken substantially upon a plane passing along section line 7—7 of FIG. 6 illustrating further structural details of the burner assembly.

Referring now specifically to the drawings, the apparatus for removing pollutants is disclosed in combination with a novel charcoal kiln 10 which includes a collecting duct 12 along the bottom thereof arranged in a particular manner to be described hereinafter for discharge of the gaseous effluent to a separator generally designated by the numeral 14 with the gaseous effluent then being discharged to a burner assembly generally designated by the numeral 16 that includes a discharge stack assembly generally designated by the numeral 18.

Figure 3:
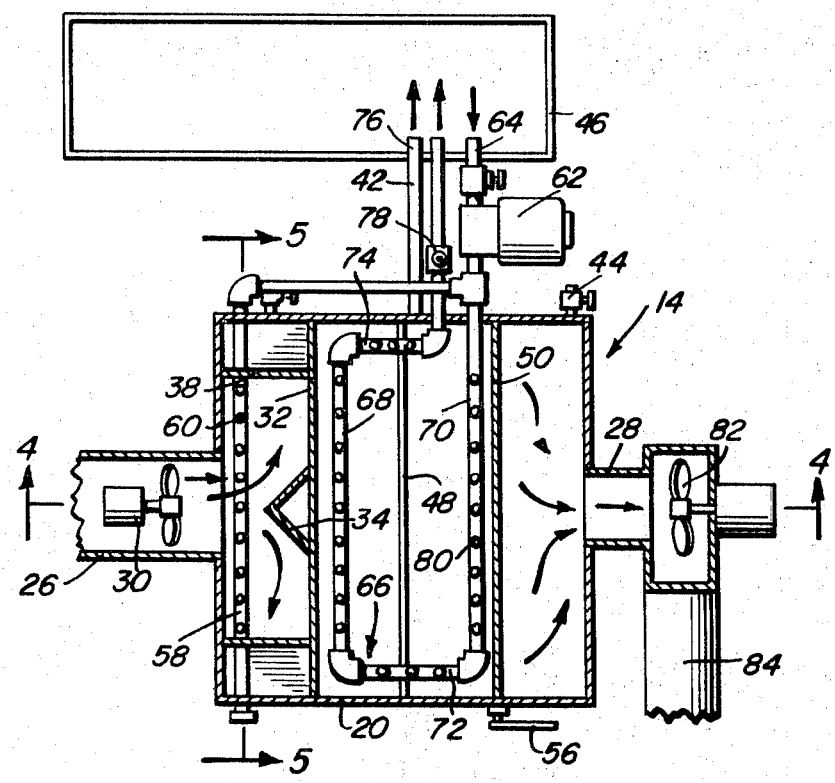
FIG. 3 is a top plan sectional view of the separator component of the apparatus for removing pollutants from gaseous effluent.
Figure 4:
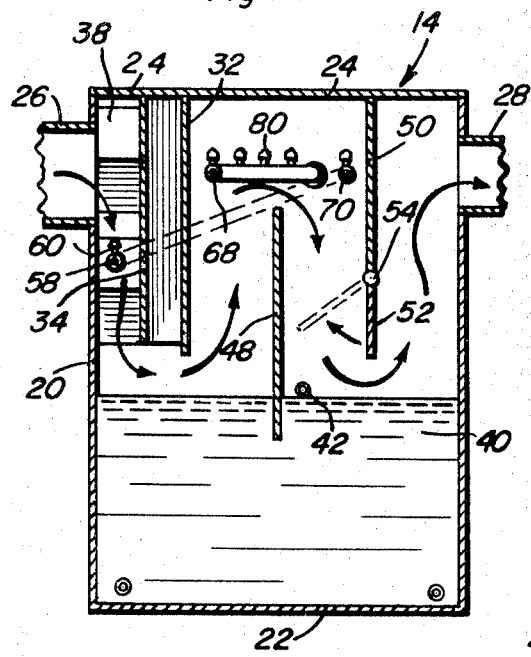
FIG. 4 is a vertical sectional view taken substantially upon a plane passing along section line 4—4 of FIG. 3 illustrating further structural details of the separator.
Figure 5:
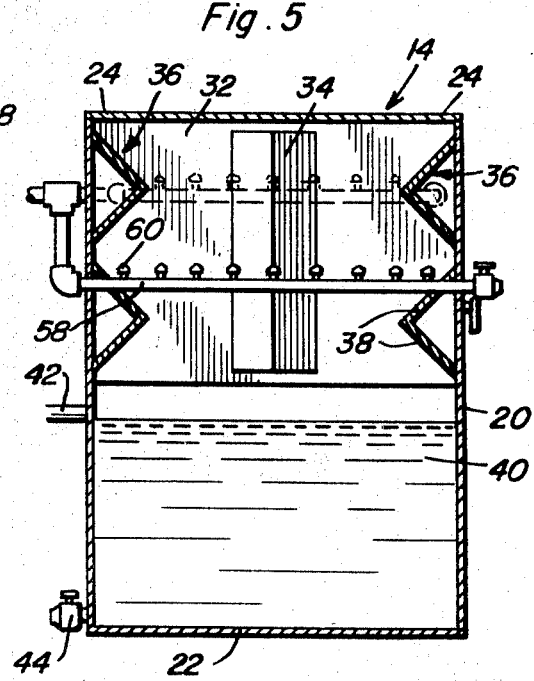
FIG. 5 is a vertical sectional view taken substantially upon a plane passing along section line 5—5 of FIG. 3 illustrating further structural details of the separator.

The apparatus for removing pollutants which includes the separator 14 and the burner assembly 16 may be varied in size while retaining the proportions of the individual components to enable use thereof with various producers or sources of polluted gaseous effluent. FIGS. 3–5 illustrate in more detail the specific construction of the separator 14 which includes a vertically disposed housing 20 that includes a bottom wall 22 and a top wall 24 with the housing 20 being vertically elongated and substantially square in cross-sectional plan configuration as illustrated in FIG. 3. One wall of the housing 20 is provided with an inlet duct 26 while the opposite wall of the housing 20 is provided with an outlet duct 28 with the inlet duct 26 including a fan assembly 30 oriented therein such as a conventional axial flow fan or any other suitable type of fan to provide a forced draft and discharge the gaseous effluent into the housing 20 and move the gaseous effluent through the housing 20.

Supported from the top wall 24 of the housing 20 is a vertically disposed baffle plate 32 that extends vertically from the top wall 24 to a point below the inlet duct 26 with the baffle plate 32 being spaced from the housing wall having the inlet duct 26 therein thus causing the gaseous effluent to move downwardly around the lower end of the baffle plate 32. Mounted on the surface of the baffle plate 32 in facing relation to the inlet duct 26 is a vertically disposed splitter 34 in the form of a generally V-shaped member which extends vertically substantially throughout the length of the baffle plate 32 and substantially centrally aligned with the inlet duct 26 for dividing or splitting the gaseous effluent into two flow paths directed toward opposite sides of the housing 20 as illustrated by the arrows in FIG. 3.

Each side wall of the housing 20 is provided with a pair of vertically aligned deflectors generally designated by the numeral 36 each of which includes a pair of angulated plates 38 defining substantially a V-shaped configuration with the apex of the V-shaped configuration being disposed inwardly from the side wall of the housing 20 as illustrated in FIG. 5. Thus, the stream of gaseous effluent which has been deflected towards the side wall of the housing engages the deflectors 36 for further division of the flow path and turbulence of the gaseous effluent as it enters the housing 20. The locational relationship of the deflectors 36 is illustrated in FIG. 5 and the elevational relationship thereof is illustrated in FIG. 4.

The bottom of the housing forms a sump or tank for a quantity of water or other liquid cleaning solution 40 with an overflow pipe 42 being communicated with the housing for retaining the upper level of the liquid 40 at a predetermined elevation which is spaced below the bottom edge of the baffle plate 32 as illustrated in FIG. 4. The housing 20 is also provided with valved drainpipes 44 at the lower end thereof for draining the water or other liquid 40 in the sump or reservoir in the bottom of the housing 20 and the overflow pipe 42 discharges into a reservoir or tank 46 disposed alongside of the housing or in any suitable location. Thus, the upper surface of the water 40 provides a limiting surface for the flow path of the gaseous effluent and also provides an impingement surface for the gaseous effluent for deflecting the gaseous effluent around the bottom edge of the baffle plate 32.

An intermediate vertical baffle plate 48 is provided between the side walls of the housing with the lower edge of the baffle plate 48 being disposed below the upper surface of the water 40 and the upper edge of the baffle plate being supported below the center of the top wall 24 of the housing as illustrated in FIG. 4 with the top edge of the intermediate baffle plate 48 generally being in horizontal alignment with the lower portion of the inlet duct 26 and outlet duct 28. With the intermediate baffle plate 48 being spaced from the baffle plate 32, the gaseous effluent thus passes below the lower edge of the baffle plate 32 and then upwardly and over top of the top edge of the baffle plate 48 as illustrated by the arrows in FIG. 4.

A second vertical baffle plate 50 is connected with and extends downwardly from the top wall 24 between the baffle plate 48 and the wall of the housing 20 having the outlet duct 28 therein. The baffle plate 50 includes a lower edge portion that is swingable about an axis parallel to the baffle plates. This swingable portion of the baffle plate 50 is designated by numeral 52 and is in the form of a baffle damper with the hinge axis being designated by the numeral 54 with any suitable hinge structure being employed to enable the baffle damper 52 to be positioned in various positions such as indicated by the broken lines in FIG. 4. The baffle damper 52 is rigid with a pivot pin or hinge pin forming a portion of the hinge 54 which extends outwardly of the housing and is provided with a handle 56 by which the baffle damper 52 may be adjusted to a desired position and retained in that position until another change is desired. The specific construction of the handle, the hinge structure and any suitable lock mechanism for retaining the handle in adjusted position is conventional in nature. When the damper 52 is aligned with the baffle plate 50, the lower edge thereof is spaced from the upper surface of the water 40 in substantially the same relation as the space between the lower edge of the baffle plate 32 and the upper surface of the water so that the gaseous effluent passes under the baffle plate and around the lower edge of the damper 52 and then upwardly to the outlet duct 28. The damper 52 serves as a means for varying the resistance to flow of the gaseous effluent through the housing and thus serves as a means for adjusting the velocity or rate of flow thereof and thus adjusts or varies the time of retention of the gaseous effluent in the separator 14.

The portion of the housing 20 between the baffle 32 and the wall having the inlet duct 26 therein is provided with a horizontally extending water pipe or manifold 58 having a plurality of upwardly directed spray nozzles 60 thereon. As illustrated in FIG. 4, the manifold 58 and the nozzles 60 are disposed immediately below the inlet duct in spaced relation to the apex of the splitter 34 and below the upper deflector 36 and slightly above the inner apices of the lower deflectors 36 as illustrated in FIG. 5. The manifold 58 is communicated with a water pump and motor assembly 62 having an inlet pipe 64 communicating with the water reservoir 46. Thus, as the pump-motor unit operates, water will be discharged from the spray nozzles 16 into the gaseous effluent which washes much of the heavier components, such as solid particulate material and the like, from the gaseous effluent with this material and a substantial portion of the water dropping into the lower end of the housing 20.

Disposed in the upper portion of the housing 20 above the top edge of the baffle plate 48 in spaced relation thereto and in spaced relation to the baffle plates 32 and 50, there is a generally rectangular spray assembly designated by reference numeral 66 and including transversely extending manifolds 68 and 70 and an end manifold 72 which interconnects the manifolds 68 and 70 and a shorter manifold 74 connected to the end of the manifold 68 and connected to a discharge line 76 which extends back to the water reservoir 46 and is provided with a discharge control valve 78 therein. The manifold 70 is communicated with the pump-motor unit 62 so that water circulates through the manifold 70, manifold 72, manifold 68, manifold 74, valve 78 and return pipe 76 back to the reservoir 46 with all of the manifolds having upwardly directed spray nozzles 80 thereon. The discharge valve 78 serves to control the quantity of water being sprayed by the nozzles 80 by determining the quantity of water that would be bypassed or circulated back to the water reservoir 46. The two water spray curtains formed by the nozzles on the manifolds 68 and 70 and the additional water spray from the nozzles on the manifolds 72 and 74 will pass through the gaseous effluent as it is passing upwardly between the baffle plates 48 and 32, over the top edge of the baffle plate 48 and then downwardly between the baffles plates 48 and 50 and around the lower edge of the damper plate 52. During this movement, a substantial portion of the pollutants including gaseous constituents thereof will be washed from the effluent by the water with the gaseous constituents being absorbed by the water. The gaseous effluent then passes upwardly between the baffle plate 50 and the adjacent wall of the housing for discharge into the outlet duct 28 and during this movement, the water in the gaseous effluent will be removed from or detrained from the gaseous effluent for passage into the oulet duct 28 and into a fan assembly 82 incorporated therein which may be of any suitable conventional construction for discharging the cleaned gaseous effluent through a connecting duct 84 which discharges into an inlet duct 86 for the burner assembly 16.

The burner assembly 16 includes a housing 88 lined with refractory material such as bricks 90 or the like with the interior of the refractive lining including a burner chamber 92 which is in communication with the duct 86. The duct 86 includes a burner assembly 94 which may be a conventional propane or natural gas burner which may be communicated with a tank or other supply 96 of propane gas or the like through a line 98 communicating with the burner 94 in a wall known and conventional manner. A manually operated damper 100 is provided in the duct 84 to control the inflow of the cleaned gaseous effluent into the burner chamber 82. The stack assembly 18 is communicated with the burner assembly 16 and includes a tubular duct or conduit 102 extending into the burner chamber 92 and extending to a desired vertical elevation with a suitable cap 104 being provided on the upper end of the duct 102 if desired. In some instances, the gaseous effluent can be burned in the presence of air or oxygen by simple ignition without the use of supplementary fuels such as propane or natural gas. Thus, the burner assembly may be equipped for continuous ignition by means of a high voltage spark gap incorporated therein so that it will not be necessary to use supplemental fuel except during periods when high temperature incineration of the gaseous effluent is desired to completely burn the combustible constituents in the gaseous effluent which remain after passage through the separator.

As set forth previously, the apparatus is associated with a charcoal kiln 10 which is of unique construction in that it includes a housing or shell of steel or other equivalent metal 106 and includes side walls 108, end walls 110, an arcuate roof 114 and a bottom wall 116 which may also be metal or may be a concrete slab or other supporting surface. The end wall remote from the separator 14 is provided with an enlarged removable closure plate 118 secured in place by bolts 120 or any other suitable means to enable the kiln to be loaded with the wood from which charcoal is to be made. While the size of the kiln may vary, it has been found that an efficient reduction of wood to charcoal is accomplished when the shell or housing 106 is of sufficient dimensions to receive fifty cords of wood which is stacked in the kiln through the access door 118 in a conventional and well known manner.

Ignition of the wood in the kiln may be accomplished by a well known means such as by inserting a long pole, pipe or other instrument through one of the light-off doors 120 in the access door 118. For example, the long rod or pole may have a cloth sack or other absorbent material on the end thereof soaked with kerosene or a similar fuel which can be ignited or inserted through one of the doors when the covering plate for one of the doors 122 when the covering plate has been unbolted and removed. It will be appreciated that other means of ignition may be provided such as automatic ignition devices associated with a source of fuel that is communicated with the interior of the kiln at desired locations.

During ignition, relatively heavy smoke will be produced and will be discharged through a smoke collecting pipe 124 that communicates with the top of the roof 114 and extends downwardly into the collecting duct 12 which includes side portions 126 which extend along the bottom of the side walls 108 and an end portion 128 which extends along the bottom of the end wall 110. This heavy smoke is conducted to the separator 14 and burner assembly 16 for complete removal of pollutants therefrom. This initial relatively heavy smoke will continue only until the stacked wood beings to char from the top layers downwardly toward the bottom layers. When this state of burning occurs, subsequent discharge from the kiln will occur through a plurality of cross-over pipes 130 which are generally U-shaped and connected with conduits 132 communicating with the interior of the kiln at the bottom thereof as illustrated in FIG. 8. The two downturned branches of the cross-over pipes 130 are received in appropriate openings in the ducts 132 and the collecting duct such as the side duct 126. When this stage of burning occurs, the pipe 124 may be closed off or a section thereof removed and the open ends closed off with a suitable plate or the like. Also, the cross-over pipes 130 have a flange 134 on each branch thereof which rests against a corresponding seat on the duct 132 and the duct 126 which enables relative movement between the duct 126 and the ducts 132 which is caused by expansion and contraction due to variation in heat thus eliminating any tendency of these components to bend or buckle during use. Also, a suitable damper or sliding plate-type of valve 136 is provided in each of the ducts 132 to enable adjustment to properly control the formation of charcoal by controlling the rate of discharge of gaseous effluent or emissions from the kiln which is desirable at certain stages of the "burn."

A plurality of air admitting ducts 138 are communicated with the bottom of the kiln with each duct generally being of L-shaped configuration as illustrated in FIG. 9 with the air inlet ducts supplying sufficient air to sustain the restricted combustion required for production of charcoal. The air admission ducts 138 are provided with a closure plate 140 on the upper end thereof which may merely rest by gravity on the upper end of the duct to restrict the entering air as may be required by completely covering the duct or only partially covering it or to provide for a complete opening.

In addition, the kiln is provided with a ladder 142 for providing access to the roof 114 of the kiln and a plurality of plates 144 which close openings in the roof of the kiln which are provided for admitting air during the initial ignition and burning stages if required or to provide entrance into the kiln for any reason desired with these plates normally being bolted in position although other means may be provided for keeping the plates in closed condition. The specific structural details of the kiln may vary and when a steel shell is used, an insulating material such as foam plastic or the like may be provided thereon. It is pointed out that the two side ducts 126 are pitched or inclined to drain any liquids that may condense from the gaseous effluent being emitted from the kiln. For example, the duct 126 may be provided with a drain valve 146 at the lower end thereof for drainage of such condensate. Inasmuch as the liquids derived from the formation of charcoal have commercial value, the condensate may be collected and utilized effectively for other products and processes thus eliminating the pollution that would normally be caused by discharing such condensate.

By use of the separator and burner with various devices which produce an effluent containing pollutants, such pollutants may be effectively removed from the effluent before it is discharged to the air, water or to any other area with this apparatus being disclosed in combination with a charcoal kiln of a unique and novel construction and having specific problems since the formation of charcoal which basically involves the destructive distillation of wood results in the production of a gaseous effluent having many different types of pollutants entrained therein. However, the apparatus may be used in conjunction with other air and water polluting devices and installations including incinerators, fireplaces, sulphur gas emitting plants and the like.

A kiln constructed in accordance with this invention results in a low first cost and economy in subsequent maintenance and operation as compared with conventional charcoal kilns which are constructed of concrete, masonry and some metal components with frequent resulting cracking and air leakage at high kiln temperatures which may result in inefficient production of charcoal and high maintenance and operation cost. The steel kiln can be factory manufactured which renders the device movable, conveniently assembled and disassembled when the wood supply or other circumstances necessitate a move with the initial cost and well as operation and maintenance being minimized. In loading the kiln, the wood may be stacked in position therein in a conventional manner and the access door closed and the kiln ignited and operated in the manner set forth previously. The separator is placed in operation by filling the bottom portion with water until overflow is observed from the overflow line with this filling operation being achieved by operating the pump unit. After the initial filling has been completed, very little makeup water is required to maintain the overflow level. However, such makeup water may be taken from the water reservoir and a suitable supply and control mechanism may be provided for maintaining the water level in the reservoir at a predetermined elevation. The condensible constituents and removed pollutants from the gaseous effluent continually add to the liquid content of the separator and any overflow will go into the reservoir. As the process of separation of the pollutants in the gaseous effluent continues throughout the "burn" period, the viscosity of the liquid contents of the separator continues to increase which actually has a beneficial effect on the operation of the separator inasmuch as the liquids derived from the wood smoke emissions are either heavier than water or miscible in water and thus are accumulated in the spray system and may be recovered for commercial use. The burner assembly is placed in operation by using a continuous ignition deivce or by using a supplemental fuel burner which maintains a temperature of 1,000° F. or higher in the combustion chamber. The burnable pollutants in the gaseous effluent leaving the separator consist principally of carbon monoxide and some traces of alcohols, terpenes and the like all of which can be completely eliminated by combustion or incineration.

During operation of the kiln, the air inlet openings are controlled to supply sufficient air to sustain the restricted combustion required for production of charcoal. The charcoal forms from the top layer of wood, working slowly downward through the stacked wood until the entire wood fill is converted to charcoal, a process that requires from 5 to 8 days. The combustion air is therefore introduced at the bottom level of the kiln so that insufficient oxygen will be available at the top to reduce the wood completely to ashes. Thus, the steel plates laid on the opening in the air inlet ducts may be adjusted to restrict the entering air required at certain stages of the "burn." The structural details of the kiln and the ducts have not been illustrated in minute detail since various conventional structural procedures and concepts may be employed in fabricating the kiln, ducts and other components of the invention. Principally, the cooling or reduction in temperature of the gaseous effluent as it enters the separator serves to condense pollutants from the gaseous effluent and the spray nozzles discharging water into the pollutants will entrain pollutants and absorb and combine with certain pollutants for effectively removing a substantial quantity of the pollutants from the gaseous effluent. In an actual installation, the kiln, separator and burner were proportioned to receive 50 cords of wood in the kiln and the separator and burner removed pollutants from the gaseous effluent or emissions from the kiln to a level which satisfied all present-day as well as contemplated requirements for removal of pollutants before discharge into the ambient atmosphere. If desired, the apparatus for removing the pollutants may be provided in a suitable enclosure such as a building or the like so that the overall appearance of the system does not detract from the adjacent locality.

If the bottom portion of the separator housing receives a large quantity of solid particulate material or becomes thickened due to removed pollutants, a mechanical conveying device such as a screw auger or the like may be used to extract such material from the bottom of the separator for use in various processes by which such material may be converted into a useful product. Also, all of the condensate which may be obtained from the drains 46 and the drain 85 on the L-shaped pipe 84 may be used for various useful products and may be collected in any suitable manner. Also, various forced draft fan means may be employed, such as squirrel cage fans and the like and various conventional temperature controls such as thermocouples may be employed for monitoring or controlling the conditions in the various portions of the kiln, ducts, burner assembly and the like.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

I claim:

1. An apparatus for removing pollutants from gaseous effluent moving in a flow path comprising a housing disposed in the flow path and having an effluent intake and an outlet for cleaned gaseous effluent, baffle means in said housing directing the gaseous effluent in a tortuous path from the intake to the outlet, and a plurality of discharge means in said housing for directing cleaning fluid into the gaseous effluent at a plurality of areas between the intake and the outlet for removing pollutants from the effluent, said discharge means including a plurality of spray nozzles for discharging liquid cleaning fluid into the gaseous effluent, said housing including a collecting reservoir in the bottom portion thereof for receiving liquid cleaning fluid from the spray nozzles, the upper surface of the liquid cleaning fluid in the reservoir defining a surface limiting downward movement of the gaseous effluent during movement from the intake to the outlet, said baffle means including a plurality of vertically disposed baffle plates extending transversely across the housing, said baffle plates being spaced from each other and spaced from the intake and outlet, certain of the plates extending downwardly from the top of the housing and terminating above the surface of the liquid cleaning fluid in the reservoir, another of said baffle plates having its lower edge below the surface of the liquid cleaning fluid and extending upwardly from the bottom portion of the housing and terminating below the top of the housing to guide the gaseous effluent in a zigzag path, the baffle plate spaced from the intake including a vertically disposed flow splitting means for directing gaseous effluent laterally toward each side of the housing, a plurality of inwardly facing deflectors on each side of the housing for further dividing the gaseous effluent and causing turbulence thereof, a manifold with a plurality of said nozzles thereon disposed between the flow splitting means and the intake and below the intake for directing a spray of cleaning liquid upwardly into the gaseous effluent as it enters the housing, a pair of generally parallel manifolds with upwardly directed nozzles thereon disposed between the baffle plates which extend downwardly from the top wall and above the top edge of the baffle plate extending upwardly from the bottom portion of the housing for spraying liquid cleaning fluid into the gaseous effluent as it passes over the top edge of the baffle plate extending upwardly from the bottom portion of the housing and during the passage of the effluent in an upward and downward direction on either side thereof, the baffle plate disposed adjacent the outlet is provided with a swingable lower edge portion defining a damper for controlling the rate of flow of gaseous effluent through the housing thereby controlling the time in which the gaseous effluent stays in the housing, and handle means disposed exteriorly of the housing and connected with the damper for adjustably positioning the damper.

2. The structure as defined in claim 1 together with a burner assembly for receiving cleaned gaseous effluent from the housing, said burner assembly including a burner chamber, a discharge stack communicated with the chamber, and means igniting and burning the combustible constituents in the gaseous effluent in the chamber for removing the combustible pollutants from the gaseous effluent prior to discharge.

3. The structure as defined in claim 1 in combination with a charcoal kiln having side walls with bottom discharge means for gaseous effluent, a collecting duct communicated with the gaseous discharge means, said collecting duct being in communication with the intake of the separator, forced draft means incorporated in the flow path for moving the gaseous effluent from the kiln through the separator.

4. The structure as defined in claim 3 together with means communicated with the outlet from the housing for receiving cleaned gaseous effluent, said means including an afterburner assembly, a discharge stack communicated with the afterburner assembly, forced draft means interposed between the outlet of the housing and the afterburner assembly for conveying cleaned gaseous effluent from the housing to the afterburner assembly.

5. The structure as defined in claim 4 wherein said afterburner assembly includes a burner chamber having the discharge stack communicated therewith, a burner communicated with the burner chamber for igniting and burning combustible constituents in the cleaned gaseous effluent disposed in the burner chamber for removing the combustible pollutants from the cleaned gaseous effluent prior to discharge.

6. The structure as defined in claim 5 wherein the baffle plate disposed adjacent the outlet in the housing has a swingable lower edge portion which can be angulated in relation to an adjacent baffle or adjacent portion of the housing for varying the area of the path of flow through the housing, means exteriorly of the housing for controlling the position of the swingable lower edge portion of the baffle plate.

7. The structure as defined in claim 6 wherein a water reservoir tank is provided exteriorly of the housing and is communicated therewith by an overflow pipe for maintaining a predetermined level of liquid cleaning fluid in the housing, pump means communicating with the reservoir tank and each of the manifolds for discharging water through the nozzles, the manifolds located above the top edge of the baffle plate extending upwardly from the bottom portion of the housing having a return line communicated with the reservoir tank, a throttling valve in said return line for controlling the pressure in the manifold.

8. The structure as defined in claim 7 wherein the pair of parallel manifolds are interconnected by end manifolds extending across the top edge of the baffle plate extending upwardly from the bottom portion of the housing, said end manifolds including nozzles for spraying liquid cleaning fluid into the gaseous effluent passing over the end portions of the baffle plate extending upwardly from the bottom portion of the housing.

9. The structure as defined in claim 8 wherein said kiln including means providing restricted air inlet to the bottom portion thereof for restricted combustion within the kiln, said air inlet means including a plurality of inlet ducts spaced peripherally along the bottom of the kiln, said bottom discharge means including a plurality of discharge ducts spaced peripherally along the bottom of the kiln commuciated with the collecting duct, said collecting duct having a pitch of inclination incorporated therein whereby any condensate in the duct will drain to a low point therein, discharge means in said duct at the low point for discharging any condensate, a collecting pipe communicating with the collecting duct and the top of the kiln for transferring smoke created during initial ignition of the material in the kiln to the collecting duct whereby all gaseous effluent from the kiln will be collected in the collecting duct, each of the discharge ducts between the kiln and the collecting duct including a cross-over pipe movably connected with the collecting duct and the discharge duct to enable expansion and contraction of the collecting duct in relation to the discharge ducts during heat changes therein to eliminate stresses caused by the expansion and contraction due to heat, each of the discharge ducts including a damper therein, each of the air inlet ducts including means to restrict the air entering the inlet duct with said means being in the form of a plate gravity resting against an open upper end of the inlet duct for movement in relation thereto.

* * * * *